(12) United States Patent
Cordes et al.

(10) Patent No.: US 10,369,892 B2
(45) Date of Patent: Aug. 6, 2019

(54) COIL UNIT OF A DEVICE FOR INDUCTIVE TRANSMISSION OF ELECTRICAL POWER

(71) Applicant: IPT Technology GmbH, Efringen-Kirchen (DE)

(72) Inventors: Felix Cordes, Freiburg (DE); Niklas Endler, Schwörstadt (DE)

(73) Assignee: IPT TECHNOLOGY GMBH, Efringen-Kirchen (DE)

( * ) Notice: Subject to any disclaimer, the term of this patent is extended or adjusted under 35 U.S.C. 154(b) by 66 days.

(21) Appl. No.: 15/437,773

(22) Filed: Feb. 21, 2017

(65) Prior Publication Data

US 2017/0240057 A1   Aug. 24, 2017

(30) Foreign Application Priority Data

Feb. 22, 2016   (DE) .......................... 10 2016 103 042

(51) Int. Cl.

| B60L 53/00 | (2019.01) |
|---|---|
| B60L 11/18 | (2006.01) |
| H02J 50/90 | (2016.01) |
| H02J 50/10 | (2016.01) |
| H01F 27/02 | (2006.01) |

(Continued)

(52) U.S. Cl.
CPC .............. B60L 11/182 (2013.01); B60L 53/12 (2019.02); B60L 53/30 (2019.02); B60L 53/34 (2019.02); H01F 27/02 (2013.01); H01F 38/14 (2013.01); H02J 50/10 (2016.02); H02J 50/90 (2016.02); Y02T 10/7005 (2013.01);

(Continued)

(58) Field of Classification Search
None
See application file for complete search history.

(56) References Cited

U.S. PATENT DOCUMENTS

2012/0181875 A1*  7/2012  Wechlin ................... B60L 3/00
                                                              307/104
2012/0261482 A1  10/2012  Vollenwyder et al.
(Continued)

FOREIGN PATENT DOCUMENTS

GB        2505516 A       3/2014

OTHER PUBLICATIONS

Result of examination report for German Patent Application No. 10 2016 103 042.2 dated Feb. 22, 2016.

*Primary Examiner* — Robert Grant
*Assistant Examiner* — Tynese V McDaniel
(74) *Attorney, Agent, or Firm* — Paul D. Bianco; Gary S. Winer; Fleit Gibbons Gutman Bongini & Bianco PL

(57) ABSTRACT

In a coil unit of a device for inductive transmission of electrical power with a cover, a base and a coil arranged between the cover and base. During operation of the device, the cover faces another coil unit and the base faces away from it. At least one support element, which mechanically supports the cover on the base, is arranged between the cover and the base. At least one cavity is formed between the cover and the support element by protrusions on the cover and/or on the support element, whereby the cover lies on the support element, and/or at least one cavity is formed between the base and the support element by protrusions on the support element and/or on the base, whereby the support element lies on the base. Sensors or elements for magnetic flux guidance can be arranged protected from mechanical load in such a cavity.

15 Claims, 3 Drawing Sheets

(51) Int. Cl.
*H01F 38/14* (2006.01)
*B60L 53/12* (2019.01)
*B60L 53/30* (2019.01)
*B60L 53/34* (2019.01)

(52) U.S. Cl.
CPC .......... *Y02T 10/7088* (2013.01); *Y02T 90/121* (2013.01); *Y02T 90/122* (2013.01); *Y02T 90/14* (2013.01)

(56) References Cited

U.S. PATENT DOCUMENTS

2013/0002041 A1* 1/2013 Hatanaka ................ H01F 38/14
307/104
2017/0033606 A1* 2/2017 Maikawa ................ H02J 50/70

\* cited by examiner ns of the coil unit with the same mechanical stability.

COIL UNIT OF A DEVICE FOR INDUCTIVE TRANSMISSION OF ELECTRICAL POWER

FIELD OF THE INVENTION

The invention concerns a coil unit of a device for inductive transmission of electrical power.

BACKGROUND

Such devices are used for inductive charging of a rechargeable battery incorporated in an electric vehicle. In this case a primary coil unit is provided at a charging station which is brought close to a secondary coil unit arranged on the vehicle for charging of the vehicle battery so that the inductive transmission of power is made possible from a primary coil contained in the primary coil unit to a secondary coil contained in the secondary coil unit. The primary coil unit of a charging station is ordinarily arranged on the ground of a vehicle parking area or recessed into the ground, and the secondary coil unit is mounted on the bottom of an electric vehicle.

The primary coil unit of a charging station can be exposed to a high mechanical load when a vehicle inadvertently rides onto or over it with a wheel when entering or leaving the charging station. This should not lead to damage or destruction of the primary coil unit. Although the secondary coil unit in an electric vehicle is potentially less vulnerable to being mechanically loaded, this is also not ruled out, for example, when driving over a bump or an object lying on a roadway. Neither the coil of a coil unit, nor sensors that can be arranged in a coil unit for its monitoring, nor ferrite elements that are ordinarily contained in a coil unit for magnetic flux guidance are designed to withstand high mechanical loads.

SUMMARY

At least some embodiments of the invention address effective protection of electrical and/or magnetic components of a coil unit of a device for inductive transmission of electrical power from mechanical load.

Advantageous embodiments are also disclosed.

In a coil unit of a device according to the invention for inductive transmission of electrical power, with a cover, a base and a coil arranged between the cover and the base, wherein the cover, during operation of the device, faces another coil unit and the base faces away from it, at least one support element that mechanically supports the cover on the base is arranged between the cover and the base. For this purpose, at least one cavity is formed between the cover and the support element by protrusions on the cover and/or on the support element, whereby the cover lies on the support element, and/or at least one cavity is formed between the base and the support element by protrusions on the support element and/or on the base, whereby the support element lies on the base.

Sensors to detect a conductive object on the cover can be arranged so as to be protected from mechanical load in such cavities on the top of a coil unit, i.e., beneath the cover and elements to guide the magnetic flux can be arranged on the bottom of a coil unit, i.e., above the base. Mechanical loadability of the sensors and the flux guidance elements is then no longer necessary. In comparison with a box-shaped housing, in which exclusively vertical outside walls carry an upper cover and an external force acting on it must be transferred downward to the ground, use of a support element according to the invention with cavities formed by protrusions permits a much more compact and lighter design with the same mechanical stability.

Although the invention is also applicable in other devices for inductive transmission of electrical power, its application to the primary coil unit of a charging station for an electric vehicle is particularly advantageous, since this can be exposed to a relatively high mechanical load by a wheel of a vehicle.

It is particularly expedient if the protrusions are formed in one part with the support element and/or the cover and/or the base, since this simplifies production of the corresponding part on which the protrusions are provided in comparison with implementation of the protrusions by fastening of separate parts, which would also be possible in principle. A number of individual protrusions separate from each other are preferably provided, through which a single continuous cavity is formed through which the protrusions merely pass without dividing it into several parts, since such a continuous cavity offers maximum design freedom for the arrangement of sensors and/or flux guidance elements.

The protrusions preferably extend symmetrically about an axis perpendicular to the surface of the cover and/or the support element and/or the base and have an end surface lying parallel to the cross-sectional surface of the coil unit. Surface force transfer and axial force flow are thereby ensured. In addition, the protrusions preferably have a rounded cross-sectional shape without corners so that the occurrence of point-like force peaks is prevented.

If at least one cavity is formed by protrusions both between the cover and the support element and between the support element and the base, it is particularly advantageous if a protrusion is provided between the support element and the base for each protrusion between the cover and the support element at the same lateral position. This ensures force flow to the base in the straight direction from the cover through a first protrusion, most of the support element and a second protrusion being flush with the first one with almost purely compressive stress and largely without bending and shear stresses. It is particularly expedient in this case if the protrusions are formed only on the support element, since then they only need be correspondingly shaped and the cover and base can have flat surfaces.

If at least one cavity is formed by protrusions between the cover and the support element, this is particularly suited for arrangement of proximity sensors for detection of an object lying on the cover. Inductive sensors in the form of measuring coils that are arranged in a regular arrangement laterally distributed over the coil unit are particularly suitable for detection of a conductive object that was heated during operation of the inductive power transmission. The entire surface of the cover of the coil unit can thereby be monitored. Such measuring coils, which can be inexpensively made planar on printed circuit boards, are only slightly loadable mechanically and therefore require correspondingly protected mounting on a coil unit, which the invention guarantees.

Measuring coils of this type can advantageously be arranged both between protrusions and enclosing a protrusion. The latter arrangement possibility results from the basic shape of a coil, whose windings always extend around an axis. The measuring coils can then be mechanically fixed by the protrusions in the lateral direction. In this way the protrusions simultaneously function as positioning aids for the measuring coils, for example, by providing printed circuit boards on which the measuring coils are incorporated as components or are made planar directly in the form of spiral conductive traces with holes or lateral cutouts of appropriate size in the grid pattern of the protrusions so that a defined lateral arrangement of the measuring coils is already produced by arranging the printed circuit boards to match the protrusions without any additional elements being required for this purpose.

It is particularly advantageous if two layers of measuring coils are arranged one above the other and the measuring coils of one layer are arranged exclusively between protrusions and the measuring coils of the other layer are arranged exclusively enclosing a protrusion. The two layers can be laterally offset relative to each other so that the measuring coils of one layer cover intermediate spaces not covered by the measuring coils of the other layer, i.e., both layers together cover the cross-sectional surface of the coil unit almost without gaps.

If at least one cavity is formed by protrusions between the support element and the base, this is particularly suitable for arrangement of flux guidance elements in the form of plates of material of high magnetic permeability, for example, ferrite, which requires protection from mechanical loads because of its known sensitivity to fracture. Grooves can be expediently made in the support element, starting from such a cavity, in which windings of the coil provided for power transmission are positioned. The coil can thereby also be effectively protected from mechanical loads.

In order to close off the cavity supported by the protrusions, in which elements protected from mechanical load are arranged, a ridge is best suited, which runs along the edge of the support element and/or the cover or along the edge of the support element and/or the base, depending on whether the cavity is situated between the cover and the support element or between this and the base. The support element is preferably made in one piece and consists of a fiber-reinforced thermosetting plastic.

BRIEF DESCRIPTION OF THE DRAWINGS

An embodiment example of the invention is described below with reference to the drawing. In the drawings

DETAILED DESCRIPTION

Figure 1:
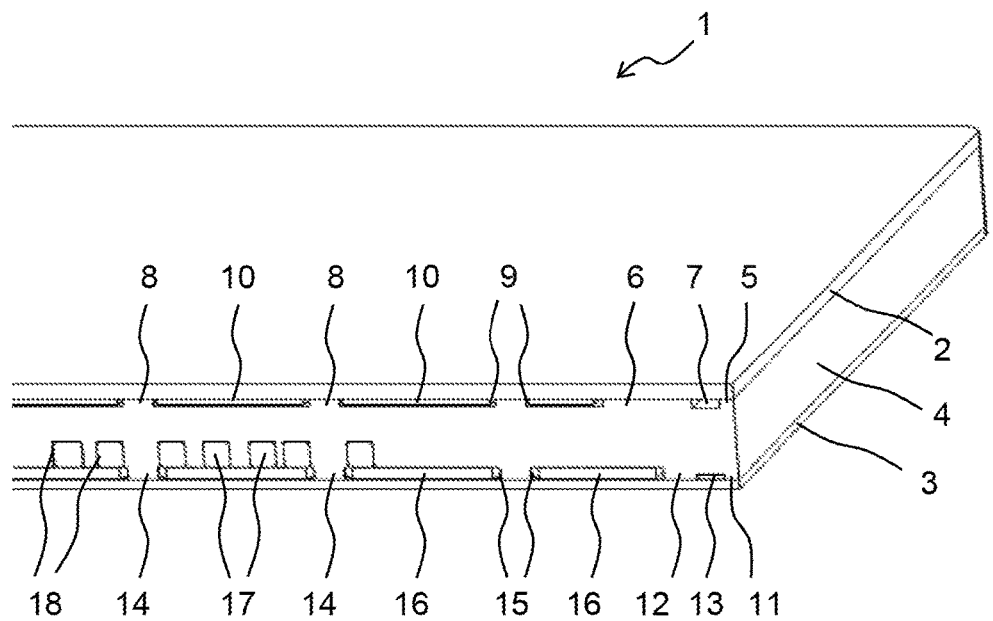
FIG. 1 shows a perspective view of a primary coil unit according to the invention cut on one side.
Figure 2:
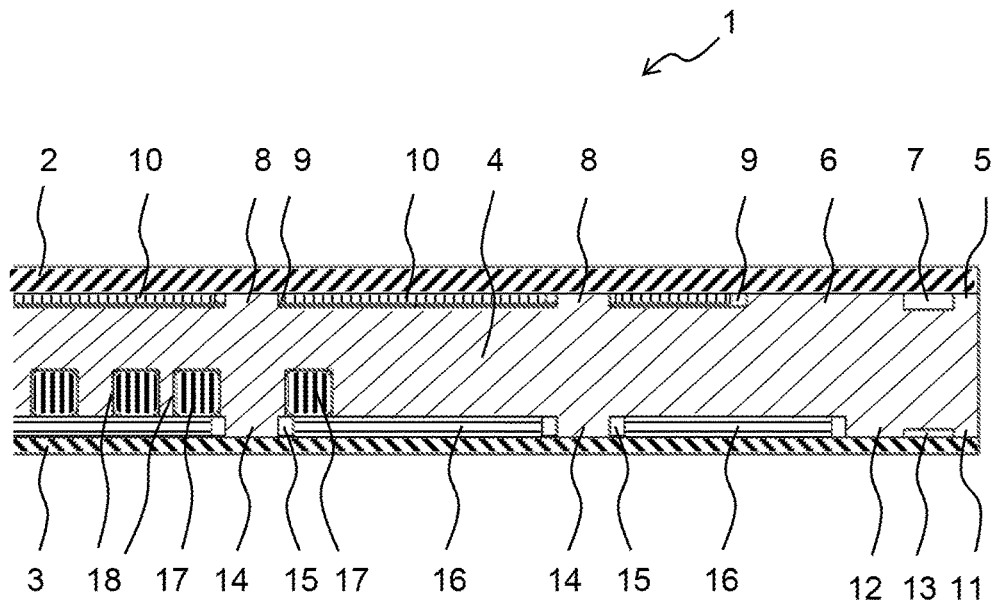
FIG. 2 shows an enlarged sectional view of part of the primary coil unit of FIG. 1.

As is apparent from FIGS. 1 and 2, a primary coil unit 1 according to the invention of a charging station for an electric vehicle has as mechanical components a cover 2, a base 3 and a support element 4 arranged between cover 2 and base 3. Cover 2 during operation, i.e., during charging of an electric vehicle, faces the secondary coil unit mounted on the bottom of the electric vehicle. The base 3 lies on the ground of a vehicle parking area or the primary coil unit 1 is fully or partially recessed into the ground of a vehicle parking area. In either case the base 3 transfers the weight of the primary coil unit 1 and any force additionally exerted from above to the ground via the cover 2 on the primary coil unit 1.

Just like the support element 4, the cover 2 consists of a hard, plastic material of high strength, for example, a fiber-reinforced thermosetting plastic. Appropriate materials are known under the name sheet molding compound (SMC). The base 3 consists of a metal, for example, aluminum, in order to shield the strong magnetic field coming from the primary coil unit 1 during operation on the side facing away from the secondary coil unit of the electric vehicle.

The cover 2 and the base 3 each have the form of a flat plate with parallel upper and lower surfaces. The support element 4 has a continuous outer ridge 5 on its edge on the top and a continuous inner ridge 6. The ridges 5 and 6 define between them a continuous groove 7 that serves to accommodate a glue seal that connects cover 2 with support element 4. A number of individual cylindrical protrusions 8 are distributed over the upper surface of the support element 4 in a regular arrangement in the form of a matrix with rows and columns of equal spacing, only a single row of which can be seen in FIGS. 1 and 2, through which the cutting plane of these figures passes. The upper end surfaces of protrusions 8 lie in the same plane as those of the continuous ridges 5 and 6 and form support surfaces for cover 2 distributed over the upper surface of the support element 4 for cover 2 and are thereby mechanically supported.

A continuous cavity 9 is formed by the protrusions 8 on the top of support element 4 between it and the cover 2. A number of inductive proximity sensors are arranged in this cavity 9 in the form of measuring coils 10 that are provided to detect the presence of an electrically conductive object on the outer surface of cover 2. This is necessary in order to be able to avoid heating of such an object by induction from eddy currents during operation of inductive power transmission and the hazards stemming therefrom. Such measuring coils 10 must not be mechanically loaded. By their arrangement in cavity 9, they are also effectively protected from mechanical load, if, for example, an electric vehicle inadvertently drives onto the primary coil unit 1 with a wheel and exerts a large force on cover 2, since the cover 2 is supported by protrusions 8 and no force is transferred to the measuring coils 10.

As on its top, the bottom of the support element 4 has a continuous outer ridge 11 on its edge and a continuous inner ridge 12. The ridges 11 and 12 define between them a continuous groove 13 that serves to accommodate a glue seal that connects the base 3 with support 4. A number of individual cylindrical protrusions 14 are distributed over the lower surface of support element 4 in a regular arrangement in the form of a matrix with rows and columns of equal spacing, only one row of which can be seen in FIGS. 1 and 2, through which the cutting plane of these figures passes. The lower end surfaces of protrusions 14 lie in the same plane as those of the continuous ridges 11 and 12 and form support surfaces distributed over the lower surface of the support element 4 for the base 3 and mechanically support the support element 4 on base 3.

The protrusions 8 on the top of support element 4 and the protrusions 14 on the bottom of support element 4 are arranged in the same grid and at the same lateral positions. This means that a force taken up by a protrusion 8 on the top of support element 4 from cover 2 is conveyed by the support element 4 in a straight direction to an opposite protrusion 14 on the bottom of support element 4 and transferred from it to base 3. The entire force flow runs in a straight direction from cover 2 through support element 4 directly to base 3. Because of this, even with a relatively small cross-sectional surface of protrusions 8 and 14, high loadability is guaranteed, since the force being transferred is a purely compressive force. The protrusions 8 and 14 preferably have the same cross section on the top and bottom of support element 4 as in the embodiment example depicted in FIGS. 1 and 2, since they are exposed to the same force.

A continuous cavity 15 is formed by the protrusions 14 on the bottom of support element 4 between it and the base 3. A number of flux guidance elements 16 made of a material of high magnetic permeability are arranged in this cavity 15, for example, in the form of ferrite plates, which are provided to guide the magnetic flux generated during inductive power transmission of the primary coil unit 1 in a lateral direction. Such flux guidance elements 16 must not be mechanically loaded. In particular, the material ferrite is a very brittle material sensitive to fracture. By their arrangement in cavity 15 the flux guidance elements 16 are also effectively protected from mechanical load if, for example, an electric vehicle inadvertently drives onto the primary coil unit 1 with a wheel and exerts a large force on cover 2, since this force is taken up by the upper protrusions 8, passed through support elements 4 and transferred to base 3 through the lower protrusions 14 without exerting a force on the flux guidance elements 16.

The primary coil 17 is arranged in grooves 18, which are formed in the support element 4, starting from the lower cavity 15. The primary coil 17 is also thereby effectively protected from a harmful force effect during loading of cover 2, since the support element 4 diverts the force occurring on the grooves 18 with the windings of primary coil 17 via the lower protrusions 14 to base 3 without these grooves 18 experiencing a noticeable deformation. This is the result of direct force flow from the upper protrusions 8 to the lower protrusions 14.

Figure 3:
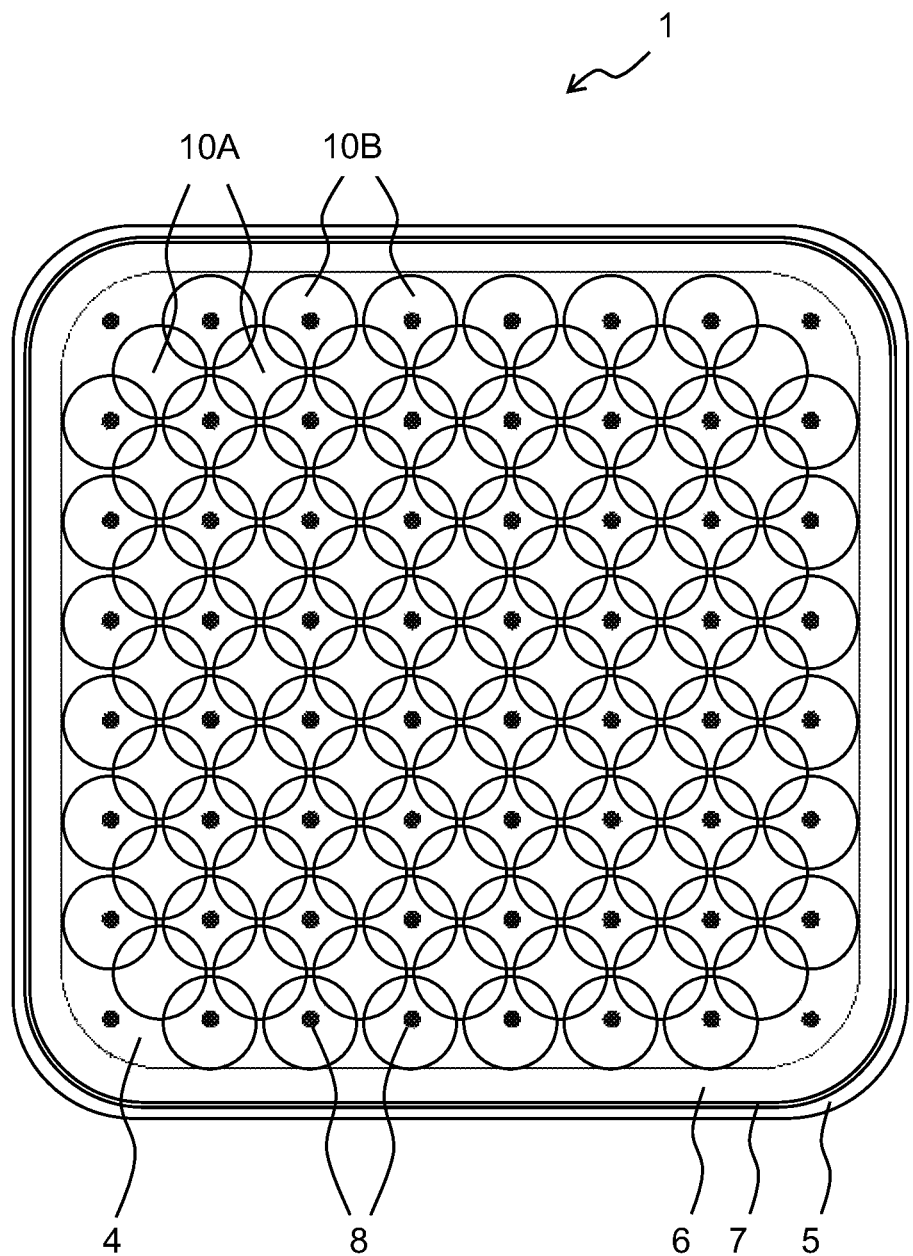
FIG. 3 shows a simplified schematic view of the top of the primary coil unit of FIG. 1 with a two-layer matrix of measuring coils and FIG. 4 shows a simplified schematic view of the bottom of the primary coil unit of FIG. 1 without base.

A simplified view of the primary coil unit 1 is shown in FIG. 3 from the top without cover 2. The regular two-dimensional arrangement of the cylindrical upper protrusions 8 in the form of a matrix with an identical grid pattern in the row and column direction is there readily apparent. The measuring coils 10 are schematically depicted in FIG. 3 as circles, two layers 10A and 10B of measuring coils 10 arranged vertically one above the other being provided here. For example, the measuring coils 10 can be made as planar coils on printed circuit boards, in which case one layer 10A is situated on the top and the other layer 10B on the bottom of the printed circuit board. The two layers 10A and 10B are offset relative to each other both in the direction of the rows and in the direction of the columns by half the grid dimension. The measuring coils 10 of the second layer 10B therefore precisely cover the gap existing between measuring coils 10 of the first layer 10A so that the cross-sectional surface of the primary coil unit 1 is fully covered and even small conductive objects on cover 3 can be reliably detected.

The measuring coils 10 of the first layer 10A are arranged in the center in a square whose corners are defined by the four adjacent protrusions 8. The measuring coils 10 of the second layer 10B are arranged around a protrusion 8 so that the vertical center axis of protrusion 8 represents the coil axis. In this way, the desired complete covering of the cross-sectional surface of the primary coil unit 1 can be achieved without interfering with the upper protrusions 8. The protrusions 8 function here as mechanical stops for lateral fixation of the measuring coils 10, by providing printed circuit boards on which the measuring coils 10 are mounted as components or made planar directly in the form of spiral conductive traces with holes and/or lateral cutouts of appropriate size in the grid pattern of the protrusions 8.

Through the intervention of protrusions 8 with such holes and/or cutouts, a defined lateral position of the printed circuit boards and therefore the measuring coils 10 on a support element 4 is achieved.

Figure 4:
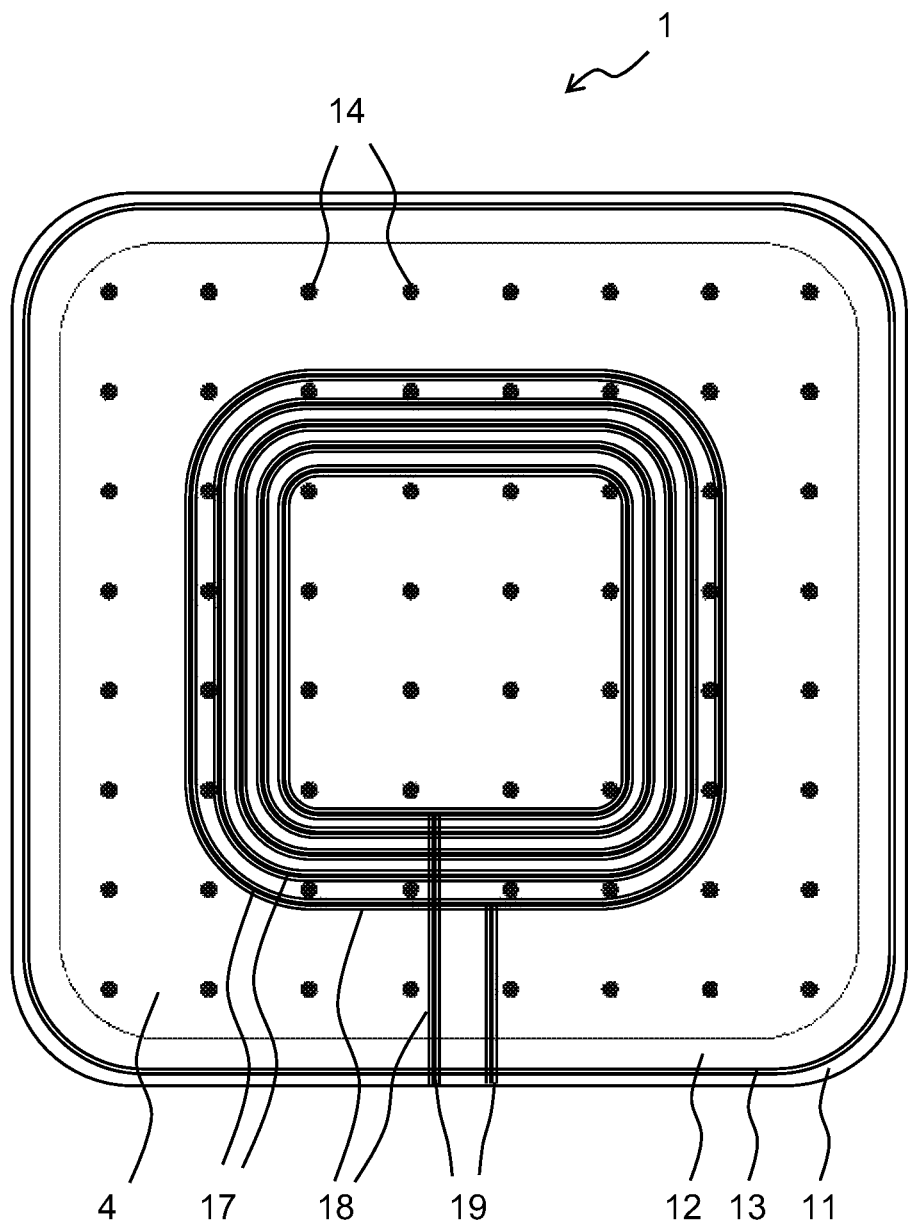

A simplified view of the primary coil unit 1 from the bottom without base 3 is shown in FIG. 4. Here again the regular two-dimensional arrangement of the cylindrical lower protrusions 14 in the form of a matrix with the same grid pattern in the row and column direction is readily apparent, in which case the lower protrusions 14 are arranged at the same lateral positions as the upper protrusions 8 in FIG. 3. The grooves 18, in which windings of the primary coil 17 lie, run in the intermediate spaces between the lower protrusions 14. The windings are therefore partially not equidistant from each other, as is apparent in FIG. 4, on the outermost winding. Since the primary coil 17 has a planar shape, the grooves 18 actually have the form of a spiral, which is not shown in FIG. 4 for the sake of simplicity. For the supply lines 19 of primary coil 17, as for the windings of the primary coil 17, grooves 18 running between protrusions 14 are provided in the support element 4, which lead outward from the windings to the edge of the support element 4, in which one of the supply lines must cross the windings because of the spiral shape, which can be made possible by recessing the groove of this supply line in the intersection area.

The flux guidance elements 16 positioned in the lower cavity 15 are not shown in FIG. 4. They cover the entire cross-sectional surface of the primary coil unit 1 in order to guide the magnetic field generated by primary coil 17 beneath the primary coil 17 in the lateral direction and to produce a path of low reluctance for the magnetic flux. As is apparent in FIG. 1, the flux guidance elements 16 each have a cutout or a hole at those locations at which a lower protrusion 14 is situated in order to permit passage of the lower protrusions 14 through the layer of flux guidance elements 16.

In the embodiment example presented here, protrusions 8 and 14 are provided on both sides of support element 4. When required, however, it is also possible to provide such protrusions 8 or 14 only on one side, for example, only on the top, if no mechanically sensitive flux guidance elements 16 are arranged on the bottom, or only on the bottom, if no mechanically sensitive proximity sensors are arranged on the top. The other side in this case could have a flat surface without protrusions 8 or 14. Another arrangement of protrusions 8 and/or 14 could also be chosen. For example, instead of a matrix arrangement, an arrangement on concentric rings would also be conceivable. In particular, the arrangement of lower protrusions 14 can be adapted to the shape of primary coil 17, in which case the arrangement of the upper protrusions 8 is also established, if protrusions 8 and 14 are provided on both sides of the support element, since a direct straight force flow must always be guaranteed.

The embodiment example presented here pertains to a primary coil unit 1 of a device for inductive transmission of electrical power, but the invention is also applicable to a secondary coil unit, although a primary coil unit 1 of a charging station for an electric vehicle is potentially more exposed to mechanical load. One skilled in the art will also easily recognize that the cavity 9 between a cover 2 and a support element 4 could also be formed by protrusions on the bottom of cover 2 and that a cavity 15 could also be formed between a support element 4 and a base 3 by protrusions on the top of base 3 or that protrusions 8 and/or 14 on a support element 4 could also be combined with protrusions on a cover 2 and/or on a base 3. The same also reasonably applies to the outer closure of cavities 9 and 15 through ridges 5 and 6 or 11 and 12.

The cylindrical shape of protrusions 8 and 14 is also to be understood merely as an example. The protrusions 8 and 14, for example, could also have an oval cross section or could be in the form of a truncated cone or barrel. Such modifications and comparable ones are at the discretion of one skilled in the art and are encompassed by protection of the claims.

What is claimed is:

1. A coil unit of a device for inductive transmission of electrical power, said coil unit comprising:
   a cover;
   a base;
   a coil arranged between the cover and the base, during operation of the device the cover facing another coil unit and the base facing away from the other coil unit;
   at least one support element arranged between the cover and the base, the at least one support element mechanically supporting the cover on the base;
   at least one cavity formed between the cover and the support element by first protrusions on at least one of the cover and the support element, the cover mechanically supported on the support element via the first protrusions;
   at least one other cavity formed between the base and the support element by second protrusions on at least one of the support element and the base, the support element mechanically supported on the base via the second protrusions; and
   proximity sensors to detect an object lying on the cover arranged in the at least one cavity formed between the cover and the support element,
   wherein the proximity sensors are inductive sensors in the form of measuring coils, which are distributed in a regular arrangement laterally over the coil unit; and
   wherein two layers of measuring coils are arranged one above the other, all of the measuring coils of one layer arranged between first protrusions, all of the measuring coils of the other layer are arranged enclosing first protrusions, and the two layers are laterally offset relative to each other so that the measuring coils of one layer cover the intermediate spaces not covered by the measuring coils of the other layer.

2. The coil unit according to claim 1, wherein the coil unit is the primary coil unit of a charging station for an electric vehicle, the coil is the primary coil of the charging station, and the other coil unit is the secondary coil unit of the electric vehicle.

3. The coil unit according to claim 1, wherein the first and second protrusions are formed in one part with the support element.

4. The coil unit according to claim 1, wherein the first and second protrusions each include a number of individual protrusions separate from each other.

5. The coil unit according to claim 1,
   wherein the first protrusions extend symmetrically about an axis perpendicular to the surface of the cover and/or the support element,
   the second protrusions extend symmetrically about an axis perpendicular to the surface of the support element and/or the base, and
   the first protrusions have an end surface lying parallel to the cross-sectional surface of the coil unit as well as a rounded cross-sectional shape without corners.

6. The coil unit according to claim 1, wherein a second protrusion is provided between the support element and the base for each first protrusion between the cover and the support element at the same lateral position.

7. The coil unit according to claim 1, wherein the first protrusions are formed on the support element, and the second protrusions are formed on the support element.

8. The coil unit according to claim 1,
   wherein
   the measuring coils are mechanically fixed by first protrusions in the lateral direction.

9. The coil unit according to claim 1, wherein flux guidance elements are arranged in the at least one other cavity formed between the base and the support element, the flux guidance elements being in the form of plates of a material with high magnetic permeability.

10. The coil unit according to claim 1,
    wherein grooves, starting from the at least one other cavity formed between the support element and the base, are formed in the support element, and
    windings of the coil provided for power transmission are positioned in the grooves.

11. The coil unit according to claim 1, wherein the at least one cavity formed between the cover and the support element is closed off outwardly by at least one peripheral ridge on the edge of the support element and/or on the edge of the cover and
    the at least one other cavity formed between the support element and the base is closed off outwardly by at least one continuous ridge on the edge of the support element and/or on the edge of the base.

12. The coil unit according to claim 1, wherein the support element is formed in one piece and includes a fiber-reinforced thermosetting plastic, the cover includes a fiber-reinforced thermosetting plastic, and the base is formed of metal.

13. The coil unit according to claim 1, wherein upper end surfaces of the first protrusions form first support surfaces that mechanically support the cover on the support element, and lower end surfaces of the second protrusions form second support surfaces that mechanically support the support element on the base.

14. The coil unit according to claim 6, wherein a force exerted on the cover is taken up by the first protrusions, passed directly through the support element, and transferred through the second protrusions to the base.

15. The coil unit according to claim 1,
    wherein flux guidance elements are arranged in the at least one other cavity formed between the base and the support element, the flux guidance elements being in the form of plates of a material with high magnetic permeability,
    the proximity sensors arranged in the at least one cavity are protected from mechanical load by the first protrusions, and
    the flux guidance elements arranged in the at least one other cavity are protected from mechanical load by the second protrusions.

* * * * *